(12) United States Patent
Huang et al.

(10) Patent No.: US 12,452,095 B2
(45) Date of Patent: Oct. 21, 2025

(54) HUMAN-COMPUTER INTERACTION METHOD AND SYSTEM, AND APPARATUS

(71) Applicant: Huawei Technologies Co., Ltd., Shenzhen (CN)

(72) Inventors: Shengsen Huang, Dongguan (CN); Xianyi Chen, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 244 days.

(21) Appl. No.: 18/185,203

(22) Filed: Mar. 16, 2023

(65) Prior Publication Data

US 2023/0224181 A1 Jul. 13, 2023

Related U.S. Application Data

(63) Continuation of application No. PCT/CN2021/118906, filed on Sep. 17, 2021.

(30) Foreign Application Priority Data

Sep. 17, 2020 (CN) .......................... 202010983742.6

(51) Int. Cl.
*H04L 12/02* (2006.01)
*G06F 3/041* (2006.01)
*G10L 17/00* (2013.01)
*H04L 12/18* (2006.01)

(52) U.S. Cl.
CPC ........ *H04L 12/1831* (2013.01); *G06F 3/0416* (2013.01); *G10L 17/00* (2013.01)

(58) Field of Classification Search
CPC .... H04L 12/1831; G06F 3/0416; G10L 17/00
See application file for complete search history.

(56) References Cited

U.S. PATENT DOCUMENTS

| 2009/0099850 | A1 | 4/2009 | Do et al. | |
| 2017/0221488 | A1* | 8/2017 | Xiong | G10L 17/02 |
| 2019/0265881 | A1* | 8/2019 | Hirukawa | G10L 15/26 |
| 2019/0364358 | A1* | 11/2019 | Zhu | H04R 1/406 |

FOREIGN PATENT DOCUMENTS

| CN | 104866745 A | 8/2015 |
| CN | 106776836 A | 5/2017 |
| CN | 109669662 A | 4/2019 |
| CN | 110767226 A | 2/2020 |
| KR | 20200013902 A | 2/2020 |

* cited by examiner

*Primary Examiner* — Ibrahim Siddo
(74) *Attorney, Agent, or Firm* — Slater Matsil, LLP

(57) ABSTRACT

A human-computer interaction method relates to the field of human-computer interaction technologies. The method includes: establishing a correspondence between a first voiceprint and a first output position on a touchscreen; and receiving first voice, and when it is determined that a voiceprint of the first voice matches the first voiceprint, recognizing content of the voice, and outputting and displaying the content to the first output position.

20 Claims, 8 Drawing Sheets

HUMAN-COMPUTER INTERACTION METHOD AND SYSTEM, AND APPARATUS

CROSS-REFERENCE TO RELATED APPLICATIONS

This application is a continuation of International Application No. PCT/CN2021/118906, filed on Sep. 17, 2021, which claims priority to Chinese Patent Application No. 202010983742.6, filed on Sep. 17, 2020. The disclosures of the aforementioned applications are hereby incorporated by reference in their entireties.

TECHNICAL FIELD

This application relates to the field of human-computer interaction technologies, and in particular, to a human-computer interaction method and system, and an apparatus.

BACKGROUND

Human-computer interaction (HCI); or human-machine interaction (HMI) is knowledge for studying an interactive relationship between a system and a user. The system herein may refer to a variety of machines, or a computerized system and computerized software. In human-computer interaction involving touchscreen input, input may be implemented by using a touch operation. However, due to cost and technical reasons, in the manner of implementing touchscreen input by using the touch operation, joined-up handwriting and difficulty in controlling handwriting often occur, causing difficult input and low input efficiency.

SUMMARY

According to the human-computer interaction method and system, and an apparatus provided in this application, a multi-modality human-computer interaction manner helps output and display voice content of one or more users to a corresponding output position on a touchscreen, to improve touchscreen input efficiency and user experience.

To achieve the foregoing objective, this application provides the following technical solutions.

According to a first aspect, this application provides a human-computer interaction method. The human-computer interaction method is applied to a human-computer interaction system. The method includes: first, establishing a correspondence between a first voiceprint and a first output position on a touchscreen; and when first voice is received and when it is determined that a voiceprint of the voice matches the first voiceprint, recognizing content of the voice, and outputting and displaying the recognized content to the first output position.

According to the first aspect of this application, voice content input by one or more users can be output and displayed to the output position indicated by the user on the touchscreen, to avoid a problem that voice content of different users is confused and displayed on the touchscreen when a plurality of people perform voice input synchronously. Therefore, touchscreen input efficiency and experience can be improved.

With reference to the first aspect, in a possible implementation, the process of establishing the correspondence between the first voiceprint and the first output position on the touchscreen may be: receiving a touch operation and second voice; and when it is determined that the touch operation matches a predetermined first rule and the second voice matches a predetermined second rule, determining the first output position on the touchscreen based on a position of the touch operation; extracting the first voiceprint from the second voice; and establishing the correspondence between the first voiceprint and the first output position.

With reference to the first aspect, in a possible implementation, the process of determining the first output position based on the position of the touch operation may be: determining a start position and a range of the first output position based on a contact position set in the position of the touch operation.

Optionally, a shape indicated by the first output position may be a rectangle, a circle, a rhombus, or the like. When the shape indicated by the first output position is a rectangle, the first output position may include coordinates of an upper left corner, a width, and a height. Alternatively, the first output position may further include a start position and an end position of the first output position, for example, coordinates of an upper left corner and coordinates of a lower right corner of the first output position.

Optionally, the system may further output and display the first output position on the touchscreen. For example, the first output position is displayed in a frame or in another form that can distinguish the first output position from a current background on the touchscreen. In addition, when the content of the first voice exceeds an upper limit that can be output at the first output position, the system may further generate a scroll bar in a horizontal or vertical direction of the first output position, and display the scroll bar on the touchscreen. In this implementation, it can be ensured that all voice content input by the user is recorded, and it is convenient for the user to view any recorded voice content at any time, so that user experience can be further improved.

With reference to the first aspect, in a possible implementation, the process of determining that the touch operation matches the predetermined first rule may be: determining that the contact position set in the position of the touch operation is consistent with a predetermined position rule, or recognizing a shape formed by the contact position set in the position of the touch operation, and determining that the shape matches a predetermined shape.

With reference to the first aspect, in a possible implementation, the process of determining that the second voice matches the predetermined second rule may be: recognizing content of the second voice, and determining that the content matches predetermined content.

Optionally, the system may further remove the correspondence between the first voiceprint and the first output position. In this way, a correspondence between the first voiceprint and another output position may be established, so that a user corresponding to the first voiceprint can switch to the another output position to input voice content of the user.

Optionally, the system may further establish a correspondence between a second voiceprint and the first output position. In addition, when third voice is received, and it is determined that a voiceprint of the voice matches the second voiceprint, content of the voice may be output to a blank area of the first output position, or the content of the first voice is overwritten. In this way, a function that a user supplements or modifies voice content (the first voice) of another user by using voice (the foregoing third voice) can be implemented. Therefore, in this implementation, a plurality of users can cooperate with each other to input content on the touchscreen by using voice, so that touchscreen input efficiency and experience can be improved. In addition, optionally, because the third voice and the first voice are made by different users, when outputting the content of the third voice, the system may further select an output format different from an output format of outputting the content of the first voice, so that a display effect is better.

Optionally, when the second voice is collected by a microphone array, a position of a sound source of the second voice may be further calculated, and before the correspondence between the first voiceprint and the first output position is established, it is determined whether the position of the sound source of the second voice and the position of the touch operation meet a preset condition. The correspondence between the first voiceprint and the first output position is established only if the position of the sound source of the second voice and the position of the touch operation meet the preset condition; or otherwise, the correspondence is not established.

Optionally, the system may further receive an image that is in front of the touchscreen and that is collected by an image collector, and analyze and track content of the image in real time before establishing the correspondence between the first voiceprint and the first output position, and determine, based on an image analysis and tracking result, whether a user performing the touch operation and a user making the second voice are a same user. Alternatively, it is determined, by combining sound source positioning and image tracking, whether the user performing the touch operation and the user making the second voice are a same user. The correspondence is established only if it is determined that the user performing the touch operation and the user making the second voice are the same user; or otherwise, the correspondence is not established.

In the foregoing two manners, when a plurality of users simultaneously start voice input, binding of a voiceprint of one user to an output position indicated by another user can be avoided, so that system robustness can be improved.

According to a second aspect, this application provides a human-computer interaction method. The human-computer interaction method is applied to a computer device. The method includes: first, establishing a correspondence between a first voiceprint and a first output position; and when first voice is received and when it is determined that a voiceprint of the voice matches the first voiceprint, recognizing content of the voice, and outputting the content to the first output position.

With reference to the second aspect, in a possible implementation, the process of establishing the correspondence between the first voiceprint and the first output position may be: receiving a contact position and second voice, and when it is determined that the contact position matches a predetermined first rule and the second voice matches a predetermined second rule, determining the first output position based on the contact position, and extracting the first voiceprint from the second voice; and establishing the correspondence between the first voiceprint and the first output position.

With reference to the second aspect, in a possible implementation, the process of determining the first output position based on the contact position may be: determining a start position and a range of the first output position based on a contact position set in the contact position.

Optionally, a shape indicated by the first output position may be a rectangle, a circle, a rhombus, or the like. When the shape indicated by the first output position is a rectangle, the first output position may include coordinates of an upper left corner, a width, and a height. Alternatively, the first output position may further include a start position and an end position of the first output position, for example, coordinates of an upper left corner and coordinates of a lower right corner of the first output position.

Optionally, the computer device may further output the first output position, for example, display the first output position in a frame or in another form that can distinguish the first output position from a current background.

With reference to the second aspect, in a possible implementation, the process of determining whether the contact position matches the predetermined first rule may be: determining whether the contact position set in the contact position is consistent with a predetermined position rule, or recognizing a shape formed by the contact position set in the contact position, and determining whether the shape matches a predetermined shape.

With reference to the second aspect, in a possible implementation, the process of determining whether the second voice matches the predetermined second rule may be: recognizing content of the second voice, and determining whether the content matches predetermined content.

Optionally, the computer device may further remove the correspondence between the first voiceprint and the first output position.

Optionally, the computer device may further establish a correspondence between a second voiceprint and the first output position. In addition, when third voice is received, and a voiceprint of the third voice matches the second voiceprint, content of the third voice may be output to a blank area of the first output position, or the content of the first voice is overwritten.

Optionally, when the second voice is collected by a microphone array, a position of a sound source of the second voice may be further calculated, and before the correspondence between the first voiceprint and the first output position is established, it is determined whether the position of the sound source of the second voice and the contact position meet a preset condition.

Optionally, the computer device may further receive an image that is in front of the touchscreen and that is collected by an image collector, and analyze and track content of the image in real time before establishing the correspondence between the first voiceprint and the first output position, and determine, based on an image analysis and tracking result, whether a user performing the touch operation and a user making the second voice are a same user. Alternatively, it is determined, by combining sound source positioning and image tracking, whether the user performing the touch operation and the user making the second voice are a same user.

For explanations of related content and descriptions of beneficial effects of the technical solution provided in any one of the second aspect and the possible designs of the second aspect, refer to the technical solution provided in the first aspect or the corresponding possible designs of the first aspect. Details are not described herein again.

According to a third aspect, this application provides a human-computer interaction system. The human-computer interaction system may be used to perform any method provided in the first aspect or the second aspect. The human-computer interaction system may include a touchscreen and a processor.

The touchscreen is configured to: receive a touch operation, and send a position of the touch operation to the processor.

The processor is configured to perform any human-computer interaction method provided in the second aspect.

For explanations of related content and descriptions of beneficial effects of any technical solution that is of the processor and that may be implemented, refer to the technical solution provided in the second aspect or the corresponding possible designs of the second aspect. Details are not described herein again.

Optionally, the human-computer interaction system may further include a voice collector, configured to: collect first voice, second voice, and third voice, and send the first voice, the second voice, and the third voice to the processor.

Optionally, the human-computer interaction system may further include an image collector, configured to: collect an image near the front of the touchscreen, and send the image to the processor. In the third aspect, for descriptions of possible technical solutions executed by the processor and the touchscreen and beneficial effects of the technical solutions, refer to the technical solutions provided in the first aspect or the second aspect or the corresponding possible designs of the first aspect or the second aspect. Details are not described herein again.

According to a fourth aspect, this application provides a computer device. The computer device may be configured to perform any method provided in the second aspect. In this case, the computer device may be specifically a processor or a device including a processor.

In a possible design, the apparatus may be divided into functional modules based on any method provided in the second aspect. In this implementation, the computer device includes a voice processing unit and an integrative processing unit.

The voice processing unit is configured to: receive first voice, and when it is determined that a voiceprint of the first voice matches a first voiceprint, recognize content of the voice.

The integrative processing unit is configured to: establish a correspondence between the first voiceprint and a first output position, and output the content of the first voice to the first output position.

The computer device further includes a contact position processing unit, configured to: receive a contact position, where the contact position is generated by a touch operation, and when it is determined that the contact position matches a predetermined first rule, determine the first output position based on the contact position.

The voice processing unit is further configured to: receive second voice, and when it is determined that the voice matches a predetermined second rule, extract the first voiceprint from the voice.

In the foregoing process, when determining the first output position based on the contact position, the contact position processing unit is specifically configured to determine a start position and a range of the first output position based on the contact position set in the contact position. Optionally, the integrative processing unit is further configured to output the first output position.

Optionally, the integrative processing unit is further configured to remove the correspondence between the first voiceprint and the first output position.

Optionally, the voice processing unit is further configured to: receive third voice, and when it is determined that a voiceprint of the third voice matches the second voiceprint, recognize content of the third voice. The integrative processing unit is further configured to establish a correspondence between the second voiceprint and the first output position; and is configured to: output the content of the third voice to a blank area of the first output position, or overwrite the content of the first voice. In this case, therefore, when outputting the third voice, the integrative processing unit is further configured to select an output format different from an output format of outputting the content of the first voice.

Optionally, when the second voice received by the voice processing unit is collected by a microphone array, the voice processing unit is further configured to calculate a position of a sound source of the second voice. In this case, the integrative processing unit is further configured to determine, before establishing the correspondence between the first voiceprint and the first output position, whether the position of the sound source of the second voice and the contact position meet a preset condition.

Optionally, the computer device may further include an image processing unit, configured to receive an image. Before the integrative processing unit establishes the correspondence between the first voiceprint and the first output position, the image processing unit is further configured to: analyze and track the image in real time, and determine, based on an analysis and tracking result, whether a user performing the touch operation and a user making the first voice are a same user.

In another possible design, the computer device includes a memory and one or more processors. The memory is coupled to the processor. The memory is configured to store computer program code, and the computer program code includes computer instructions. When the computer instructions are executed by the computer device, the computer device is enabled to perform the human-computer interaction method in any one of the second aspect and the possible designs of the second aspect.

According to a fifth aspect, this application provides a computer-readable storage medium. The computer-readable storage medium includes computer instructions. When the computer instructions are run on a human-computer interaction system, the human-computer interaction system is enabled to implement the human-computer interaction method in any possible design provided in the first aspect or the second aspect.

According to a sixth aspect, this application provides a computer program product. When the computer program product runs on a human-computer interaction system, the human-computer interaction system is enabled to implement the human-computer interaction method in any possible design provided in the first aspect or the second aspect.

For detailed descriptions of the second aspect to the sixth aspect and the implementations of the second aspect to the sixth aspect in this application, refer to detailed descriptions of the first aspect and the implementations of the first aspect. In addition, for beneficial effects of the second aspect to the sixth aspect and the implementations of the second aspect to the sixth aspect, refer to the analysis of beneficial effects of the first aspect and the implementations of the first aspect. Details are not described herein again.

In this application, a name of the human-computer interaction system does not constitute a limitation on devices or functional modules. In actual implementation, these devices or functional modules may have other names. Each device or functional module falls within the scope defined by the claims and their equivalent technologies in this application, provided that a function of the device or functional module is similar to that described in this application.

These aspects or other aspects in this application are more concise and comprehensible in the following descriptions.

DETAILED DESCRIPTION OF ILLUSTRATIVE EMBODIMENTS

Figure 1:
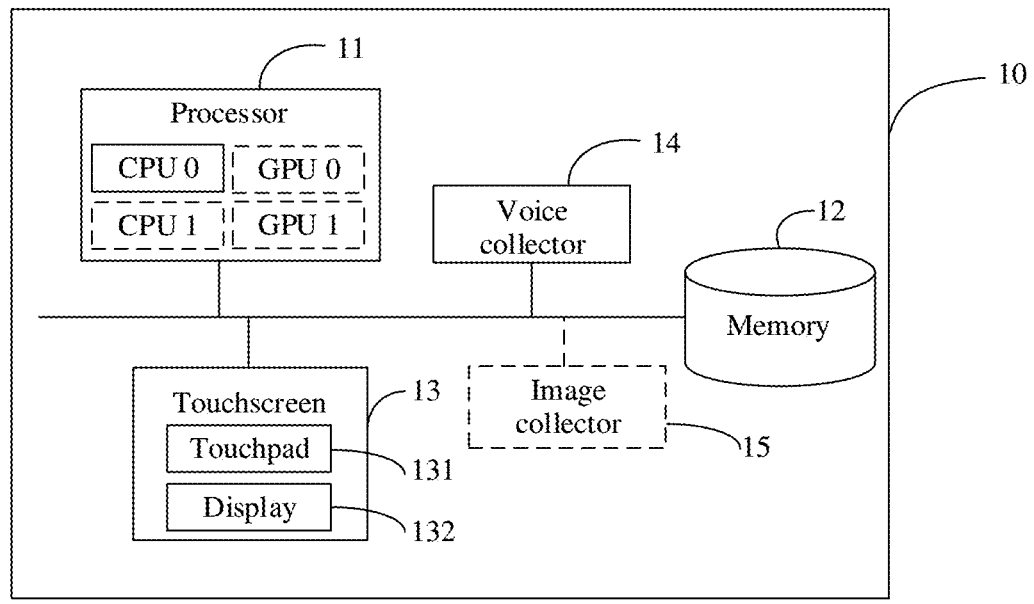
FIG. 1 is a diagram of a hardware structure of a human-computer interaction system according to an embodiment of this application.

In embodiments of this application, the word "example", "for example", or the like is used to represent giving an example, an illustration, or a description. Any embodiment or design scheme described as an "example" or "for example" in embodiments of this application should not be explained as being more preferred or having more advantages than another embodiment or design scheme. Exactly, use of the word "example" or "for example" or the like is intended to present a related concept in a specific manner.

The terms "first" and "second" in embodiments of this application are merely intended for a purpose of description, and cannot be understood as indicating or implying relative importance or implicitly indicating the quantity of indicated technical features. Therefore, features defining "first" and "second" may explicitly or implicitly include one or more of the features. In the descriptions of this application, unless otherwise stated, "a plurality of" means two or more than two.

Embodiments of this application provide a human-computer interaction method and system, and an apparatus. The human-computer interaction system obtains a touch operation and first voice, and when it is determined that the touch operation meets a predetermined first rule and the first voice meets a predetermined second rule, establishes a correspondence between a voiceprint of the first voice and an output position, where the output position is an output position that is on a touchscreen and that is determined based on the touch operation; and obtains second voice, and determines whether a voiceprint of the second voice matches the voiceprint of the first voice, and if the voiceprint of the second voice matches the voiceprint of the first voice, outputs and displays text content corresponding to the second voice to the output position on the touchscreen.

Optionally, in the foregoing process, before the correspondence between the voiceprint of the first voice and the output position is established, it may be further determined whether a position of a sound source of the first voice and a position of the touch operation meet a preset condition, and the correspondence is established only if it is determined that the position of the sound source of the first voice and the position of the touch operation meet the preset condition. The foregoing determining is to further determine whether a user performing the touch operation and a user making the first voice are a same user, so that accuracy of establishing the correspondence can be improved, and finally robustness of the system can be improved.

Similarly, optionally, before the correspondence between the voiceprint of the first voice and the output position is established, an image near the front of the touchscreen may be further collected by using a camera, and whether the user performing the touch operation and the user making the first voice are a same user is determined based on real-time analysis and tracking of the collected image. This process can also improve accuracy of establishing the correspondence, and further improve robustness of the system.

By using embodiments of this application, one or more users can implement touchscreen input in a voice manner, to improve input efficiency. In addition, voice content input by the users can be output and displayed to the output position indicated by the user on the touchscreen, to avoid a problem that voice content of different users is confused and displayed on the touchscreen. Therefore, input experience can also be improved.

The human-computer interaction method may be implemented by using an application installed on a device, for example, a human-computer interaction application.

The application may be an embedded application (namely, a system application of a device) installed on the device, or may be a downloadable application. The embedded application is an application provided as a part of the device (for example, a mobile phone). The downloadable application is an application that can provide an internet protocol multimedia subsystem (IMS) connection of the downloadable application. The downloadable application is an application that may be pre-installed on a device or a third-party application that is downloaded by a user and installed on the device.

FIG. 1 shows a hardware structure of a human-computer interaction system according to an embodiment of this application. As shown in FIG. 1, the human-computer interaction system 10 includes a processor 11, a memory 12, a touchscreen 13, and a voice collector 14. Optionally, the human-computer interaction system 10 may further include an image collector 15.

The processor 11 is a control center of the human-computer interaction system 10, and may be a general-purpose central processing unit (CPU), or may be another general-purpose processor, for example, a graphics processing unit (GPU). The general-purpose processor may be a microprocessor, any conventional processor, or the like. In an example, the processor 11 may include one or more CPUs, for example, a CPU 0 and a CPU 1 that are shown in FIG. 1. Optionally, the processor 11 may further include one or more GPUs, for example, a GPU 0 and a GPU 1 that are shown in FIG. 1.

The memory 12 may be a read-only memory (ROM) or another type of static storage device capable of storing static information and instructions, a random access memory (RAM) or another type of dynamic storage device capable of storing information and instructions, or may be an electrically erasable programmable read-only memory (EEPROM), a magnetic disk storage medium or another magnetic storage device, or any other medium capable of carrying or storing expected program code in a form of instructions or a data structure and capable of being accessed by a computer, but is not limited thereto. The memory 12 may be independent of the processor 11, or may be connected to the processor 11 by using a bus, or may be integrated with the processor 11. The memory 12 is configured to store data, instructions, or program code. When invoking and executing the instructions or the program code stored in the memory 12, the processor 11 can implement the human-computer interaction method provided in embodiments of this application.

The touchscreen 13 may specifically include a touchpad 131 and a display 132.

The touchpad 131 may be implemented in a plurality of types such as a resistive type, a capacitive type, an infrared type, and a surface acoustic wave type. The touchpad 131 is configured to: collect a touch event of a user on or near the touchpad (for example, an operation performed by the user on or near the touchpad by using any suitable object such as a finger or a stylus), and send collected touch information to another device (for example, the processor 11). The touch event performed by the user near the touchpad may be referred to as hovering touch. The hovering touch may indicate that the user does not need to directly touch the touchpad to select, move, or drag a target (for example, an icon), and instead, the user only needs to be near the device to perform a desired function.

The display 132 may be configured in a form of a liquid crystal display, an organic light emitting diode, or the like. The touchpad 131 may cover the display 132. After detecting the touch event on or near the touchpad 131, the touchpad 131 transfers the touch event to the processor 11 to determine a type of the touch event. The processor 11 may provide a corresponding visual output on the display 132 based on the type of the touch event. The display 132 is configured to display information input by the user or information provided for the user.

The voice collector 14 is also referred to as a "microphone", a "mike", or the like, and may be a single microphone; or optionally, may be a microphone array. The voice collector 14 is configured to: receive a voice signal, convert the voice signal into an electrical signal, and send the electrical signal to another device (for example, the processor 11) for processing. When the voice collector 14 is a microphone array, the voice collector 14 is further configured to locate a position of a sound source.

The image collector 15 may be an imaging device such as a CCD or a CMOS, and is also referred to as a "camera". The image collector 15 is configured to: collect an image, and send collected image data to another device (for example, the processor 11) for processing.

Figure 2:
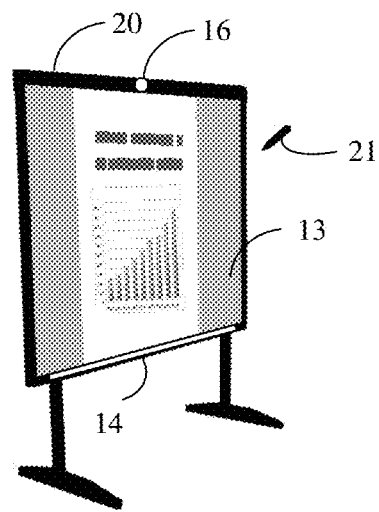
FIG. 2 is a schematic diagram 1 of a structure of a human-computer interaction system according to an embodiment of this application.

The processor 11, the memory 12, the touchscreen 13, the voice collector 14, and the image collector 15 may be integrated on one device. In this implementation, the human-computer interaction system 10 may be a terminal device, for example, an electronic whiteboard, a smartphone, a notebook computer with a touchscreen, a computer with a touchscreen, a tablet, a netbook, or an in-vehicle terminal. For example, if the human-computer interaction system 10 is the electronic whiteboard, with reference to FIG. 2, the human-computer interaction application may run on the electronic whiteboard 20. Optionally, the human-computer interaction system 10 may further include a stylus 21, and the stylus 21 is configured to input a touch operation on the touchscreen 13 of the electronic whiteboard 20.

Figure 3:
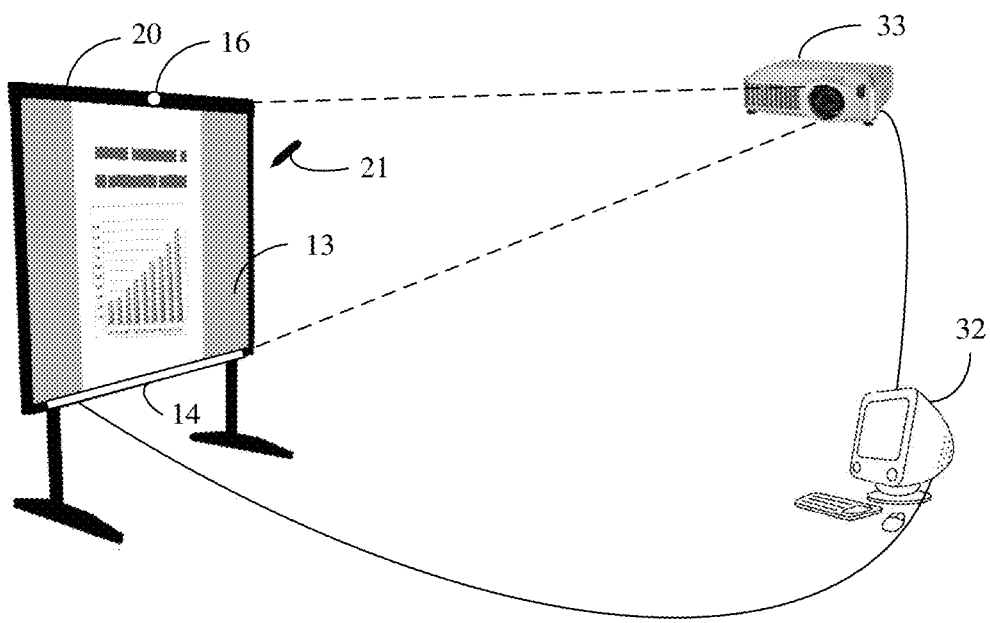
FIG. 3 is a schematic diagram 2 of a structure of a human-computer interaction system according to an embodiment of this application.

In addition, the processor 11, the memory 12, the touchscreen 13, the voice collector 14, and the image collector 15 may alternatively be separately integrated on different devices. In this implementation, the human-computer interaction system 10 may include a plurality of devices, to perform the human-computer interaction method provided in embodiments of this application. For example, the human-computer interaction system 10 shown in FIG. 3 may include the electronic whiteboard 20, a computer 32, and a projector 33. Optionally, the human-computer interaction system 10 may further include the stylus 21, and the stylus 21 is configured to input a touch operation on the touchscreen 13 of the electronic whiteboard 20. The processor 11 may be a processor of the computer 32. The memory 12 may be a memory of the computer 32. In this case, the human-computer interaction application may run on the computer 32. In addition, the touchscreen 13 may be a touchscreen of the electronic whiteboard 20. The voice collector 14 may be integrated into the electronic whiteboard 20. Alternatively, the voice collector 14 may be integrated into the computer 32, the projector 33, or the stylus 21. This is not limited in embodiments of this application. The image collector 15 may be integrated into the electronic whiteboard 20.

It should be noted that, if the voice collector 14 is a microphone array, an integration position of the voice collector 14 needs to meet a particular relationship with the touchscreen. Specifically, the integration position of the voice collector 14 may be above or below the touchscreen, parallel to a horizontal direction of the touchscreen, and a midpoint of the voice collector 14 coincides with a midpoint of the horizontal direction of the touchscreen. For example, the voice collector 14 may be integrated on an upper edge or a lower edge of the touchscreen (a deployment manner shown in FIG. 2 or FIG. 3). In addition, the voice collector 14 may also be deployed on the left or right side of the touchscreen, and is parallel to a vertical direction of the touchscreen, and the midpoint of the voice collector 14 coincides with a midpoint in the vertical direction of the touchscreen.

The structure shown in FIG. 1 does not constitute a limitation on the human-computer interaction system 10. In addition to the components shown in FIG. 1, the human-computer interaction system 10 may include more or fewer components than those shown in the figure, or combine some components, or have different component arrangements. The foregoing description of the human-computer interaction system 10 is merely an example for description, and does not constitute a limitation on this embodiment.

The following describes, with reference to the accompanying drawings, the human-computer interaction method provided in embodiments of this application.

Figure 4A:
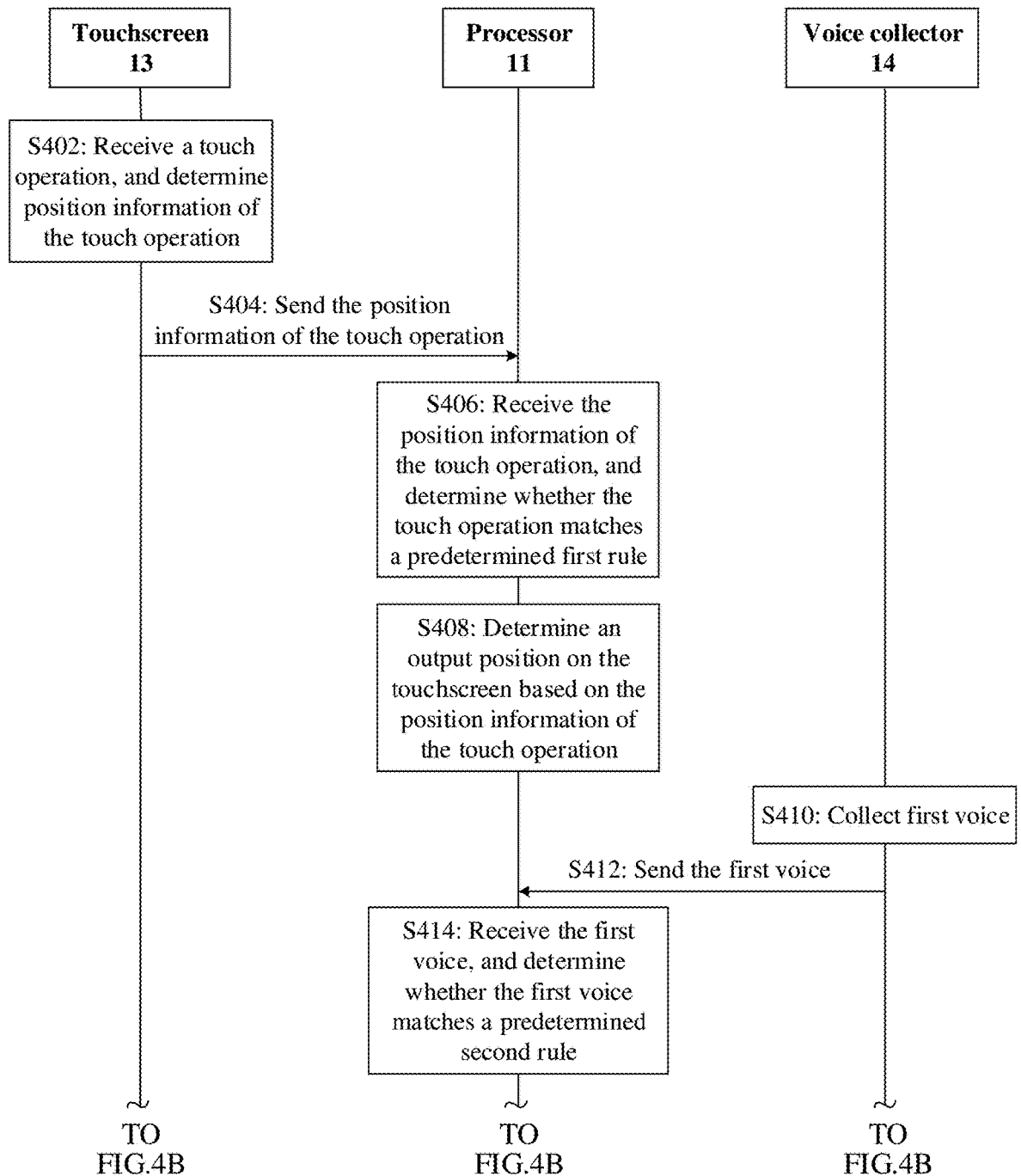
FIG. 4A and FIG. 4B are a schematic flowchart of a human-computer interaction method according to an embodiment of this application.
Figure 4B:
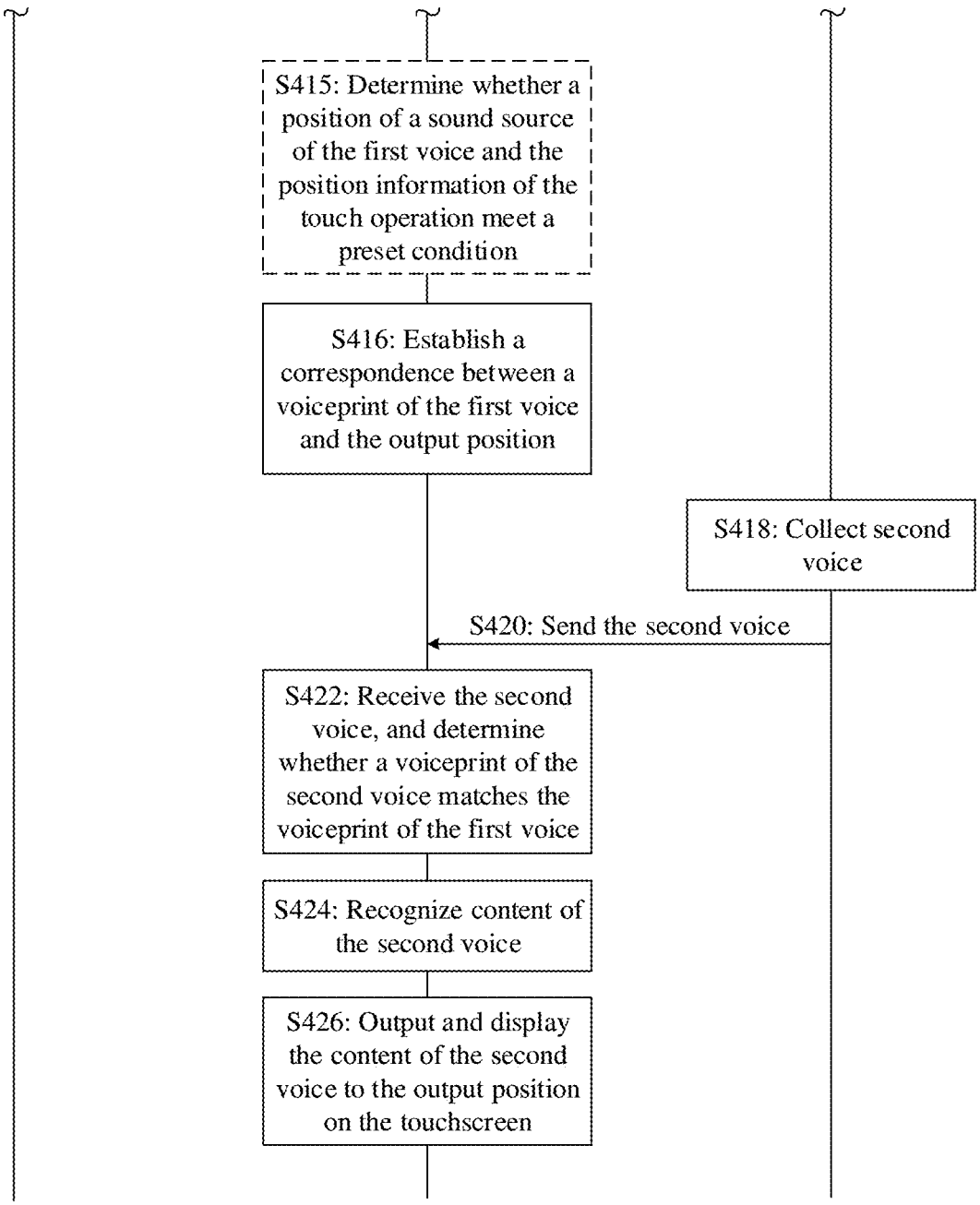

FIG. 4A and FIG. 4B are a schematic flowchart of a human-computer interaction method according to an embodiment of this application. In this embodiment, a scenario in which a plurality of users discuss in a conference site (an electronic whiteboard is deployed in the conference room) and some users want to record some content on the electronic whiteboard in a voice manner is used as an example. The human-computer interaction method includes but is not limited to the following steps.

S402: A touchscreen receives a touch operation, and determines position information of the touch operation.

If a user A performs the touch operation on the touchscreen by using a finger or a stylus, the touchscreen senses the operation and obtains the position information of the touch operation. The position information of the touch operation may be a position of a contact of the finger or the stylus on the touchscreen when the user A performs the touch operation, for example, may be coordinates of the contact generated by the touch operation of the user A on the touchscreen.

The position information of the touch operation may be a position of a single contact on the touchscreen, for example, a contact position generated when the user A touches the screen by using a single finger. Alternatively, the position information of the touch operation may be positions of a plurality of contacts on the touchscreen, for example, two contact positions generated when the user A touches the screen by using index fingers of both the left hand and the right hand.

For another example, the user A draws a line on the touchscreen by using a finger or a stylus, and in the touch operation process, the touchscreen obtains position information of the touch operation for a plurality of times in a row. The position information obtained each time includes a single contact position, representing a contact position generated at different moments in a sliding process of drawing a line by the user A.

S404: The touchscreen sends the position information of the touch operation to the processor.

Specifically, the touchscreen may send, periodically or in a triggering manner or in real time, a contact position generated by the detected touch operation to the processor. For example, the touchscreen may send one frame of data to the processor in each period. The frame of data includes a contact position detected in the period. It may be understood that, when no contact is detected in the period, the sent frame of data does not include a position of the contact.

The touchscreen may send one or more contact positions in a detection period to the processor based on a specific time period. To maintain response sensitivity and real-time performance to the touch operation, the time period is usually very short (for example, at an ms level). Therefore, in a continuous process in which the user A completes a complete touch operation, the touchscreen usually sends position information of the touch operation to the processor for a plurality of times.

Optionally, in some implementations, when sending the position information of the touch operation to the processor, the touchscreen further carries touch state information corresponding to each contact position in the position information, for example, a state such as "pressed", "lifted", or "moved".

S406: The processor receives the position information of the touch operation, and determines whether the touch operation matches a predetermined first rule.

The processor receives the position information of the touch operation in real time.

The processor usually receives position information of the touch operation for a plurality of times in a process in which the user A completes a complete touch operation. Therefore, when receiving the position information of the touch operation, the processor first determines whether a current touch operation of a user (the user A is used as an example herein) is completed. Specifically, the processor may determine, by tracking the touch operation, whether the touch operation is completed. For example, the processor starts timing each time receiving the position information of the touch operation. If the position information of the touch operation is not received again within a predetermined time interval, it is determined that the current touch operation is completed; and subsequently received position information of the touch operation is used as position information of a next touch operation from a moment at which it is determined that the current touch operation ends. If the position information of the touch operation is received again within the predetermined time interval, it is considered that the current touch operation is not completed, and the position information received again is used as the position information of the current touch operation. Then, timing starts from a moment at which the position information of the touch operation is received again, and determining continues based on the foregoing process. If the position information of the touch operation is not received again within the predetermined time interval after the position information of the touch operation is received, it is considered that the touch operation ends. The predetermined time interval is set based on an empirical value or an actual situation. This is not limited in this application. The processor may further determine, based on the touch state information carried in the position information of the touch operation, whether the touch operation ends. For example, when the touch state is "pressed" or "moved", it is determined that the touch operation is not completed; or when the touch status is "lifted", it is determined that the touch operation is completed.

The foregoing method for determining, by the processor, whether the touch operation is completed is merely an example method. Based on different driver implementations of different touchscreen manufacturers, methods for determining, by the processor, whether the touch operation is completed may also be different. This is not limited in this embodiment of this application.

When determining that the current touch operation is completed, the processor then determines whether the touch operation matches a predetermined first rule. The first rule is any predefined or configured rule related to the touch operation, and the rule is used to determine whether the user A wants to start voice input. For example, the predetermined first rule may be "any point on the touchscreen"; or may be "two points on the touchscreen, where a connection line between the two points is parallel to a horizontal direction of the touchscreen, and a distance between the two points is not less than a preset value M"; or may be "one touch track, where the touch track is parallel to the horizontal direction of the touchscreen, and a length of the touch track is not less than a preset value". The processor may determine whether one received contact position or a set of a plurality of received contact positions generated by the current touch operation meets a condition defined in the first rule, and if one received contact position or a set of a plurality of received contact positions meets the condition defined in the first rule, it may be considered that the touch operation matches the predetermined first rule.

In addition, the predetermined first rule may also be an image including a particular shape. In this implementation, the processor may use an image matching technology to compare a shape formed by the received position information of the touch operation in the current touch operation process with the predetermined shape. If a comparison result is consistency, it may be considered that the touch operation matches the predetermined first rule.

Content of the predetermined first rule and a manner of determining whether the touch operation matches the predetermined first rule may be other content and manners than the foregoing examples. This is not limited in this application.

In this step, if determining that the touch operation matches the predetermined first rule, the processor preliminarily determines that the user A wants to start voice input, and continues to perform subsequent steps in this method; or otherwise, if determining that the touch operation of the user A does not match the predetermined first rule, the processor considers that the user A performs another touch operation, and the process ends.

S408: The processor determines an output position on the touchscreen based on the position information of the touch operation.

As described in S406, when determining that the touch operation meets the predetermined first rule, the processor may determine that the user A wants to start voice input, and may further determine, from the position information of the touch operation, the output position that is on the touchscreen and that is indicated by the user A. The output position is used to indicate a start position and a range of voice content output on the touchscreen, namely, a position and a size of an output box for displaying the voice content. The following uses a case in which a shape of the output box is a rectangle as an example, to describe content included in the output position and a manner for determining the output position.

Figure 5A:
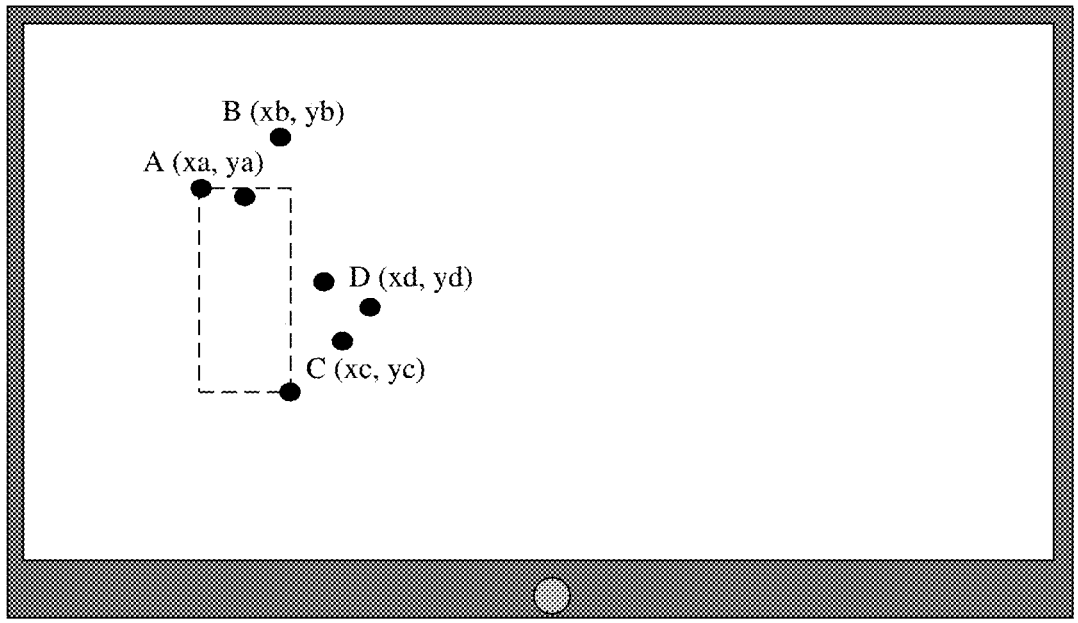
FIG. 5A to FIG. 5C are schematic diagrams of determining an output position based on a touch operation according to an embodiment of this application.
Figure 5B:
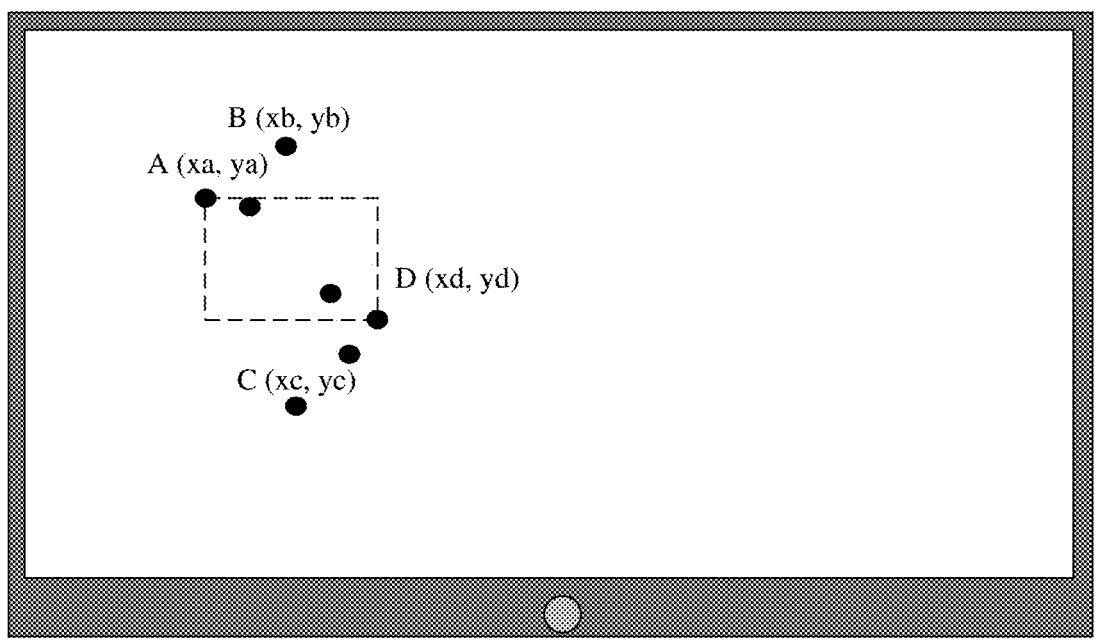

In a first implementation, the output position includes a start position of the output box, and a width and a height of the output box. If an output sequence from left to right and from top to bottom is used as an example, the start position of the output box may be coordinates of an upper left corner of the output box. The manner of determining the output position may be: using a point of an upper left corner of the touchscreen as an origin, using one side that uses the origin as an endpoint as a horizontal axis, and using the other side that uses the origin as an endpoint as a vertical axis. A contact corresponding to a minimum horizontal coordinate or a contact corresponding to a minimum vertical coordinate is selected from a contact set included in the received position information of the touch operation as a first contact, and a contact corresponding to a maximum horizontal coordinate or a contact corresponding to a maximum vertical coordinate is selected from the contact set included in the received position information of the touch operation as a second contact. For example, in a contact set shown in FIG. 5A and FIG. 5B, the processor may use a contact A or B as the first contact, and use a contact C or D as the second contact. Then, the first contact is used as the start position of the output box, a horizontal coordinate difference between the second contact and the first contact is used as the width of the output box, and a vertical coordinate difference between the second contact and the first contact is used as the height of the output box. When the contact A is used as the first contact and the contact C is used as the second contact, the start position of the output box, and the width and the height of the output box are shown in FIG. 5A. When the contact A is used as the first contact and the contact D is used as the second contact, the start position of the output box, and the width and the height of the output box are shown in FIG. 5B. A case in which the contact B is used as the first contact and the contact C or D is used as the second contact may be obtained in the same way.

Figure 5C:
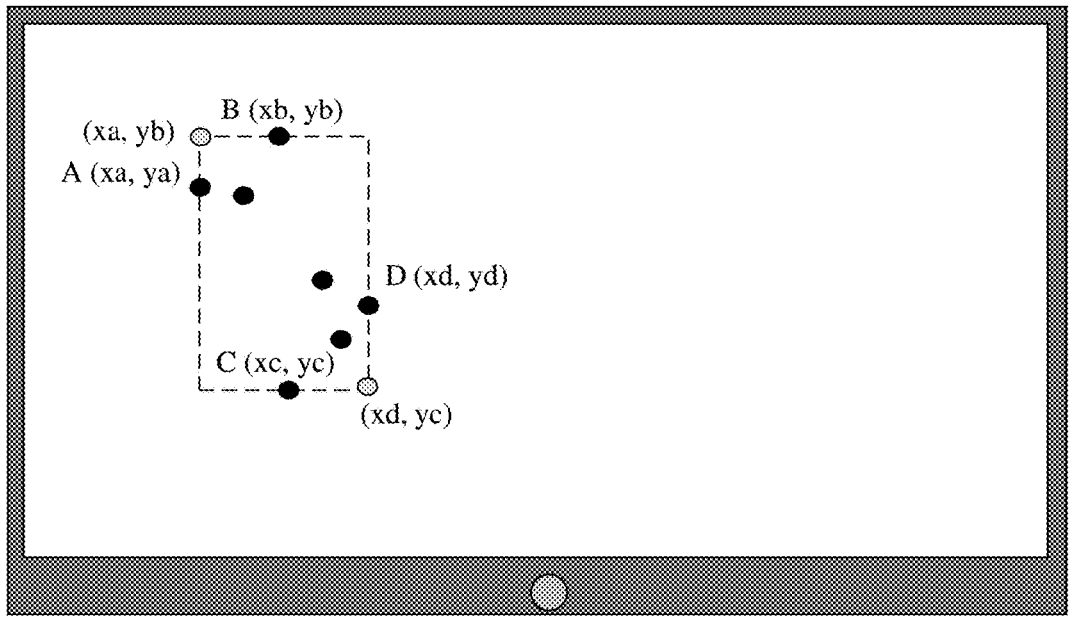

The manner of determining the output position may also be: using the point of the upper left corner of the touchscreen as the origin, and from the contact set included in the received position information of the touch operation, using a point (the point may not be an actual contact) formed by the minimum horizontal coordinate and the minimum vertical coordinate as the first contact, and using a point formed by the maximum horizontal coordinate and the maximum vertical coordinate as the second contact (the point may not be an actual contact). Then, the start position, the width, and the height of the output box may be determined in a manner similar to the foregoing manner. For example, in the contact set shown in FIG. 5A to FIG. 5C, a point (xa, yb) formed by a horizontal coordinate xa of the contact A and a vertical coordinate yb of the contact B is used as the first contact, and a point (xd, yc) formed by a horizontal coordinate xd of the contact D and a vertical coordinate yc of the contact C is used as the second contact. In this case, the start position, the width, and the height of the output box are shown in FIG. 5C.

In a second implementation, the output position includes a start position and an end position of the output box. If the output sequence from left to right and from top to bottom is still used as an example, the start and end positions of the output box are respectively coordinates of an upper left corner and a lower right corner of the output box. Similar to the description in the foregoing first implementation, the processor may determine the coordinates of the upper left corner and the lower right corner of the output box from the contact set included in the received position information of the touch operation. For example, the coordinates of the first contact and the coordinates of the second contact that are determined in the first implementation may be respectively used as the coordinates of the upper left corner and the lower right corner of the output box, so that the start position and the end position of the output box can be determined. A specific process is not described again.

Optionally, the system may define the height of the output box as a preset value. In this implementation, in this step, only the start position and the width of the output box need to be determined. Alternatively, the system may also define both the height and the width of the output box as preset values. In this implementation, in this step, only the start position of the output box needs to be determined.

The content included in the output position and the manner for determining the output position are merely examples for description. In some implementations, the system may also define the shape of the output box for displaying the voice content as another shape other than a rectangle, for example, a rhombus or a circle. Correspondingly, the content included in the output position and the manner for determining the output position may be another implementation other than the first and the second implementations. This is not limited in this embodiment of this application.

Optionally, the processor may further invoke a rendering instruction based on the determined output position (namely, the position and the size of the output box), to generate the output position, so that the output position can be displayed on the display. For example, the output position may be generated and output in a form of a border. The border of the output box may be a black dashed-line box shown in FIG. 5A to FIG. 5C, or may be a dashed-line box of another color, or may be a black solid-line box or a solid-line box of another color. The processor may display the output position in a manner of changing a background color of the output position, or in any manner that can distinguish the output position from a currently displayed background on the display. This is not limited in this embodiment of this application.

S410 to S412: A voice collector collects first voice, and sends the first voice to the processor.

Specifically, the voice collector collects a first voice signal in real time, and sends the collected first voice to the processor.

It may be understood that, because the voice signal collected by the voice collector comes from a conference site, the first voice may be made by the user A in the conference site, or may be made by another user in the conference site.

S414: The processor receives the first voice, and determines whether the first voice matches a predetermined second rule.

In this embodiment, the second rule is used to determine whether a user making the first voice, for example, the user A, wants to start voice input.

The predetermined second rule may be text of specific content, for example, "start voice input".

A method for determining whether the first voice matches the predetermined second rule may be: first converting the received first voice signal into text by using a voice recognition technology, and then determining, by using a text matching method, whether content of the received first voice is consistent with the foregoing specific content. If the content of the received first voice is consistent with the foregoing specific content, it is determined that the first voice matches the predetermined second rule; or otherwise, it may be determined that the first voice does not match the predetermined second rule. It should be understood that, the text matching manner used by the processor may be not only literal matching, but also semantic matching. For example, if the content of the first voice received by the processor is "begin voice input", the processor determines that the content of the voice matches the specific content "start voice input" at a semantic level, and therefore determines that the first voice matches the predetermined second rule.

The content of the predetermined second rule and the manner of determining whether the first voice matches the predetermined second rule may be other content and manners than the foregoing examples. This is not limited in this embodiment of this application.

In this step, if the processor determines that the first voice matches the predetermined second rule, and in combination with that the processor has received the touch operation meeting the first rule in step S406, the processor considers that the first voice is made by the user A, that is, considers that the touch operation received in step S406 and the first voice received in this step are respectively performed and made by a same user, and determines that the user A wants to start voice input, and continues to perform subsequent steps of this method. If determining that the first voice does not match the predetermined second rule, the processor considers that the first voice is not made by the user A, that is, considers that the touch operation received in step S406 and the first voice received in this step are not performed and made by a same user, for example, the voice may be randomly made by another user in the conference site. In this case, the processor determines that the user A does not want to start voice input, and does not perform the subsequent steps.

S416: The processor establishes a correspondence between a voiceprint of the first voice and the output position.

Specifically, the processor performs processing such as denoising on the first voice signal, extracts a voiceprint feature, for example, an acoustic or language feature, of the first voice from the processed signal, and establishes the correspondence between the voiceprint of the first voice, namely, the voiceprint feature of the user A, and the output position determined in S408, namely, the output position indicated by the touch operation of the user A. A specific process of establishing the correspondence may include: using voiceprint feature data of the user A as a key, using the output position (it is assumed that the output position is (x1, y1, w1, h1)) that is on the touchscreen and that is determined in S405 as a value, and storing a voiceprint library shown in Table 1 in a dictionary or hash table manner, so that the output position corresponding to the user A on the touchscreen can be determined by using the voiceprint of the user A in subsequent steps.

TABLE 1

| User | Voiceprint (key) | Output position (value) |
|------|------------------|-------------------------|
| A    | Voiceprint feature A | (x1, y1, w1, h1) |

S418 to S420: The voice collector collects second voice, and sends the second voice to the processor.

In a process of a conference, the voice collection device collects voices of different people. Therefore, the second voice may be made by the user A, or may be made by another user.

S422: The processor receives the second voice, and determines whether a voiceprint of the second voice matches the voiceprint of the first voice.

As described above, because the second voice may be made by any user, in some scenarios, in a process in which the user A outputs the voice to the output position, the user A does not want to be interfered with by voice of another user. Therefore, when receiving the second voice, the processor determines whether the second voice is made by the user A.

Specifically, the processor may use a processing manner similar to that for the first voice in S414 to process the second voice, perform processing such as denoising on the second voice, and extract a voiceprint feature of the second voice; and determine, by using a voiceprint recognition technology, whether a voiceprint of the second voice matches the voiceprint of the user A in the voiceprint library shown in Table 1, so as to determine whether the second voice is made by the user A.

If a determining result of this step is yes, it indicates that the second voice is voice of the user A, and step S424 is performed. If the determining result is no, it indicates that the second voice is not the voice of the user A. In this case, the voice signal may be discarded, and the process of collecting and determining the voice signal is performed again in step S418.

S424 to S426: The processor recognizes content of the second voice, and outputs and displays the content to the output position on the touchscreen.

The processor may convert a second voice signal into text content by using a voice recognition technology, and output and display the text content to the output position on the touchscreen. The output position is the output position that is established in S416 and that corresponds to the voiceprint of the first voice.

A process in which the processor outputs the second voice content may be: invoking, based on output position information and the text content, a rendering instruction to generate a text window including the second voice content, merging the generated text window and another window (for example, a system background window) based on the output position information to generate a pixel array, and outputting the pixel array to a predetermined storage area (for example, a frame buffer of the system). In this way, when the system sends a display signal (for example, a vertical synchronization signal), content of the predetermined storage area may be displayed on the touchscreen. The foregoing manner in which the processor outputs the content of the second voice is merely an example for description. A manner in which the processor outputs the second voice content may vary with an actual display mechanism of an operating system run by the processor. This is not limited in this embodiment of this application.

After this step is performed, in this embodiment of this application, third voice may continue to be collected, and a process of processing and determining the third voice is consistent with that of the second voice. In this way, after successfully starting the voice input function, the user A may continuously output, by using voice input, content to the output box (the output position information indicated by the touch operation) indicated by the user A.

It may be understood that, if voice content actually input by the user A exceeds the range of the output box indicated by the output position information, a horizontal or vertical direction scroll bar of the output box may be generated based on a situation, so as to ensure that the voice content input by the user A is recorded, and all recorded content can be displayed by using the scroll bar. In this case, the processor may output by default, at the output position, most recently input content. When it is detected that the user operates the scroll bar, voice text content of a corresponding part is output based on a position of the operated scroll bar, so that the user can flip through content that the user wants to view.

In addition, in actual application, the voice collector may use a microphone array. Because the microphone array can locate a position of a sound source, in another implementation, between steps S414 and S416, the following step 415 may be further included.

S415: The processor determines whether a position of a sound source of the first voice and the position information of the touch operation meet a preset condition.

A position of a user performing the touch operation is usually near the position of the touch operation. Therefore, the processor may verify, by determining whether the position of the sound source to which the first voice belongs and the position information of the touch operation meet the preset condition, whether the user making the first voice is the user A (namely, further verify whether the user that performs the touch operation and that is received in step S406 and the user that makes the first voice and that is received in step S414 are a same user).

Specifically, the processor receives the first voice collected by the microphone array, and calculates, based on the first voice, the position of the sound source to which the first voice belongs, to obtain the position of the sound source relative to the microphone array. As described in the description of the human-computer interaction system (with reference to FIG. 2 or FIG. 3), the microphone array is usually integrated on an upper edge or a lower edge of the touchscreen (that is, an integration position of the microphone array is parallel to a horizontal direction of the touchscreen, and a midpoint of the microphone array coincides with a midpoint of the horizontal direction of the touchscreen). Therefore, the position of the sound source relative to the microphone array may also be used as the position of the sound source relative to the touchscreen. The position includes a vertical distance of the sound source relative to the touchscreen, and a horizontal distance relative to the midpoint of the horizontal direction of the touchscreen.

Figure 6A:
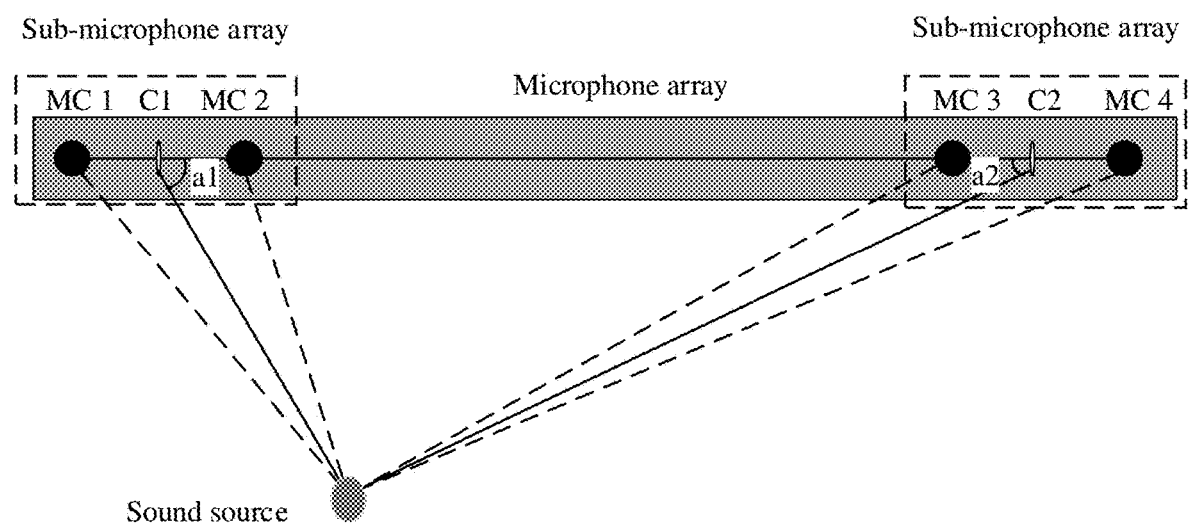
FIG. 6A and FIG. 6B are schematic diagrams of a method for calculating a position of a user making first voice according to an embodiment of this application.

It is assumed that the microphone array collecting the first voice is a microphone array including n microphones (an MC 1 to an MC n), and a process of calculating the position of the sound source by using the microphone array is as follows:

With reference to FIG. 6A, the MC 1 and the MC 2 are used as a sub-microphone array on a left end of the microphone array, and C1 is a midpoint of the sub-microphone array on the left end. Similarly, the MC 3 and the MC 4 are used as a sub-microphone array on a right end, and C2 is a midpoint of the sub-microphone array on the right end.

First, an included angle between a line connecting the sound source to C1 and the microphone array is calculated as $\alpha 1$ by using a difference between a time at which the sound source reaches the MC 1 and a time at which the sound source reaches the MC 2 (namely, a difference between a time at which the MC 1 collects a voice signal and a time at which the MC 2 collects a voice signal) and a distance between the MC 1 and the MC 2. Similarly, an included angle between a line connecting the sound source to C2 and the microphone array is calculated as $\alpha 2$.

Figure 6B:
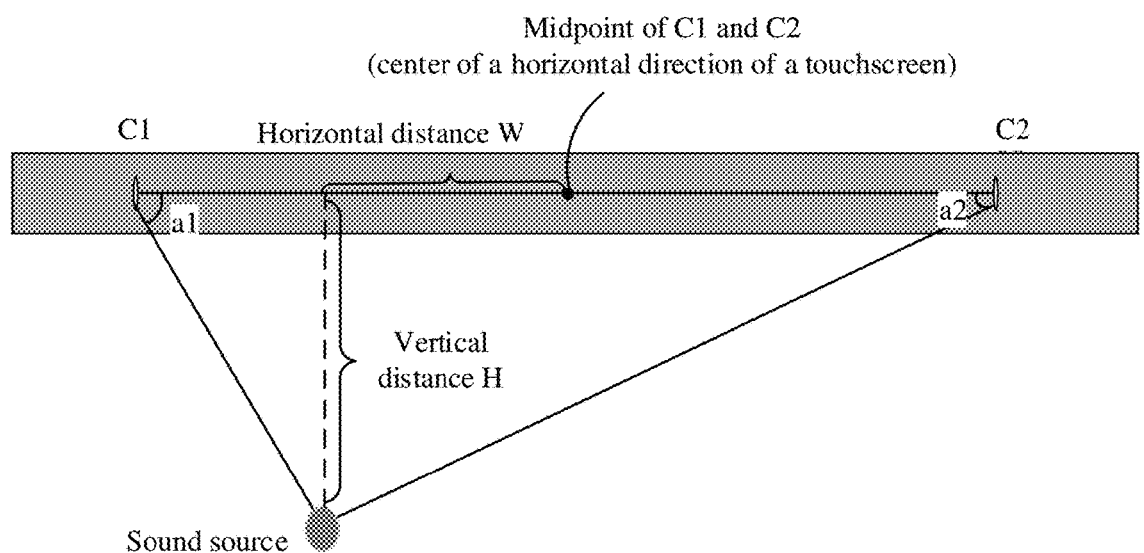

Further, with reference to FIG. 6B, because a distance between C1 and C2 is known, a vertical distance H of the sound source relative to the microphone array (namely, the vertical distance relative to the touchscreen) and a horizontal distance W relative to the midpoint of the microphone array (namely, the horizontal distance relative to the midpoint of the horizontal direction of the touchscreen) may be calculated based on a trigonometric function relationship.

It may be understood that, a vertical distance of the position of the touch operation relative to the touchscreen is 0, and a horizontal distance relative to the midpoint of the horizontal direction of the touchscreen may be obtained based on horizontal coordinates in the position information of the touch operation. Therefore, the touchscreen may be used as a reference to obtain a vertical distance between the sound source and the position of the touch operation (namely, the vertical distance of the sound source relative to the touchscreen), and a horizontal distance between the sound source and the position of the touch operation. Further, it is determined that if the vertical distance between the sound source and the position of the touch operation does not exceed a preset range (for example, set to 0.5 m based on an empirical value), and the horizontal distance between the sound source and the position of the touch operation does not exceed a preset range (for example, set to 0.5 m based on an empirical value), it is considered that the user A makes the first voice (that is, when the determining result of this step is yes, it is considered that the user performing the touch operation and the user making the first voice are a same user); or otherwise, it is considered that the user making the first voice is not the user A (that is, when the determining result of this step is no, it is considered that the user performing the touch operation and the user making the first voice are not a same user).

Optionally, the foregoing manner of determining whether the user performing the touch operation and the user making the first voice are a same user may also be implemented by collecting and tracking an image in front of the touchscreen. It is assumed that in this embodiment of this application, a camera is deployed on the touchscreen, for example, located in a center of the upper edge of the touchscreen (for example, a position shown in FIG. 2 or FIG. 3), and may collect an image near the front of the touchscreen and send the image to the processor in real time. The processor analyzes and tracks, in real time, the image collected and sent by the camera, for example, analyzes and tracks body movement and lip movement information of a person in the image, to determine whether the user performing the touch operation and the user making the first voice are a same user.

Figure 6C:
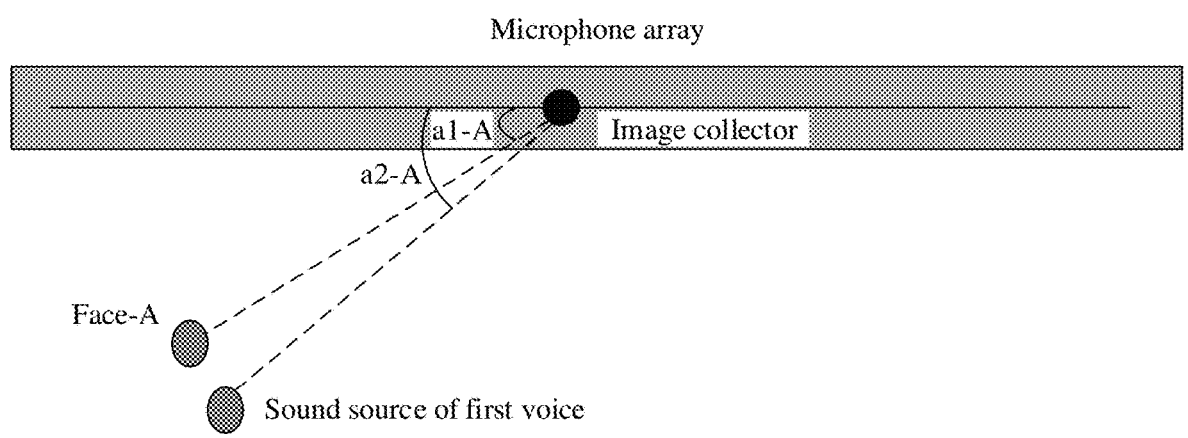
FIG. 6C is a schematic diagram of a method for determining a correspondence between voice and a facial feature according to an embodiment of this application.

In addition, whether the user performing the touch operation and the user making the first voice are a same user may be further determined by combining position calculation of the sound source of the first voice and image tracking. In this case, it is assumed that the camera is deployed at the midpoint of the microphone array, as shown in FIG. 6C. In this case, the processor may recognize, by using a machine learning algorithm, a facial feature of the user performing the touch operation, for example, a facial feature Face-A of the user A, and bind Face-A to the position, for example, (x1, y1, w1, h1), indicated by the touch operation of the user A. Then, an included angle a1-A of the facial feature, namely, Face-A of the user A relative to the camera is calculated. An included angle a2-A of the sound source of the first voice relative to the midpoint of the microphone array (namely, the camera) may be obtained by calculating the position of the sound source. Then, a1-A and a2-A are compared. If a difference between a1-A and a2-A is within a predetermined range, it is considered that the first voice and Face-A are features belonging to a same user. Therefore, it may be determined that the user performing the touch operation and the user making the first voice are a same user, and therefore, the voiceprint of the first voice may be corresponded to (x1, y1, w1, h1).

When another user and the user A start voice input synchronously in the conference site, by using the foregoing method, a correspondence between the voiceprint of the user A and an output position indicated by the another user can be prevented from being established, so that robustness of the system can be improved.

It should be further noted that, the detection and determining of the touch operation of the user A in steps S402 to S406 and the collection and determining of the voice signal of the user A in steps S410 to S414 are two conditions for determining whether the user A needs to start voice input. There is no sequence for determining in the two conditions, that is, there is no sequence for performing steps S402 to S406 and steps S410 to S414, and the detection and determining of the touch operation may be performed first, or the collection and determining of the voice signal may be performed first.

It can be learned from the foregoing description that, in this embodiment of this application, when determining, based on the touch operation and the voice input of the user A, that the user A wants to start voice input, the terminal device corresponds the voiceprint of the user A to the text output position indicated by the user A. In this way, when a plurality of people (including the user A) speak in the conference site, only voice content of the user A rather than voice content of another user in the conference site may be displayed on the text output position indicated by the user A (rather than another position on the touchscreen) by using voiceprint matching.

In actual application, there may be a scenario in which the user A wants to change the output position of the voice input after starting the voice input at the specified output position. For example, if the user A wants to change the output position from (x1, y1, w1, h1) to (x3, y3, w3, h3), in this application, binding between the voiceprint of the user A and (x3, y3, w3, h3) may be completed by using a similar process, so that the voice content of the user A is output to an output box indicated by (x3, y3, w3, h3). In this scenario, the voiceprint library stored in the system is updated from the content shown in Table 1 to content shown in the following Table 2. Specifically, the system may implement the scenario in the following two possible manners:

A first possible implementation may be as follows: The user A may indicate, by making voice that meets a third rule (for example, the voice content matches "turn off voice input"), the system to remove the correspondence between the voiceprint of the user A and the output position (x1, y1, w1, h1). Specifically, when detecting the voice that meets the third rule, the processor extracts a voiceprint of the voice, compares the voiceprint with voiceprints in the voiceprint library stored in the system one by one, and deletes a voiceprint that can match the voiceprint and an output position corresponding to the voiceprint from the voiceprint library. Then, the user A indicates, by using a process similar to the foregoing process (performing the touch operation that meets the first rule and making the voice that meets the second rule), the system to start voice input again, and establish a correspondence between the voiceprint of the user A and the newly specified output position (x3, y3, w3, h3).

A second possible implementation may be as follows: The user A directly indicates, by using a process similar to the foregoing process, the system to restart voice input, and establish a correspondence between a voiceprint of the user A and the newly specified output position (x3, y3, w3, h3). In this implementation, when receiving the voice that meets the second rule, the processor determines that the voiceprint of the voice already exists in the voiceprint library stored in the system, and then directly updates the output position corresponding to the voiceprint, so as to update the output position corresponding to the voiceprint of the user A to (x3, y3, w3, h3).

TABLE 2

| User | Voiceprint (key) | Output position (value) |
|---|---|---|
| A | Voiceprint feature A | (x3, y3, w3, h3) |

It may be understood that, as described above, a plurality of people usually discuss in the conference site. Therefore, not only the user A performs an operation on the touchscreen, but also another user, for example, the user B, may perform an operation on the same touchscreen in a process in which the user A starts and performs voice input. Based on the same implementation, in this application, voice of the user B may also be simultaneously output and displayed to an output position indicated by the user B on the touchscreen. Specifically, based on Table 2, the processor adds and stores a correspondence between a voiceprint of the user B and the output position indicated by the user B. In this case, the voiceprint library stored in the system has content shown in Table 3.

TABLE 3

| User | Voiceprint (key) | Output position (value) |
|---|---|---|
| A | Voiceprint feature A | (x3, y3, w3, h3) |
| B | Voiceprint feature B | (x2, y2, w2, h2) |

It should be noted that, when the user A and the user B start voice input synchronously, step S415 needs to be used to further verify whether the user performing the touch operation and the user making the voice are a same user, so as to avoid establishing a correspondence between the voiceprint of the user A and the output position indicated by the user B, thereby improving robustness of the system. In this case, in S422, the processor may compare the voiceprint of the second voice with voiceprints in the voiceprint library shown in Table 3 one by one. If the voiceprint of the second voice can match one of the voiceprints in the voiceprint library shown in Table 3, it is considered that the determining result of S422 is yes. Otherwise, if the second voice cannot match any one of the voiceprints in the voiceprint library stored in the system, it is considered that the determining result of S422 is no, and the second voice is not output.

Therefore, in this embodiment of this application, a user identity corresponding to the second voice is recognized by using voiceprint matching, so as to avoid a problem that voice content of different users is confused and displayed on the touchscreen due to a failure to distinguish between identities of users making the voice when a plurality of people perform voice input synchronously.

In addition, in actual application, the user A has removed a binding relationship with a specific output position, and a user C may want to modify or supplement content at the output position historically specified by the user A, for example, content in the output position (x1, y1, w1, h1). In this case, the system establishes a correspondence between a voiceprint of the user C and the output position (x1, y1, w1, h1) based on the same implementation, and appends and outputs voice content of the user C after existing content in the output box (x1, y1, w1, h1). Alternatively, the system establishes a correspondence between the voiceprint of the user C and an output position (x1', y1', w1', h1') based on the same implementation, and outputs the voice content of the user C in the output box (x1', y1', w1', h1'), where (x1', y1', w1', h1') is an output box superimposed on (x1, y1, w1, h1). Therefore, in the first possible scenario, the content of the voiceprint library stored in the system may be shown in Table 4A-1 or Table 4A-2.

TABLE 4A-1

| User | Voiceprint (key) | Output position (value) |
|---|---|---|
| A | Voiceprint feature A | (x3, y3, w3, h3) |
| B | Voiceprint feature B | (x2, y2, w2, h2) |
| C | Voiceprint feature C | (x1, y1, w1, h1) |

TABLE 4A-2

| User | Voiceprint (key) | Output position (value) |
|---|---|---|
| A | Voiceprint feature A | (x3, y3, w3, h3) |
| B | Voiceprint feature B | (x2, y2, w2, h2) |
| C | Voiceprint feature C | (x1', y1', w1', h1') |

In addition, there may also be a scenario in which the user C modifies or supplements content at a current output position of the user A, for example, (x3, y3, w3, h3). Similarly, the system may establish a correspondence between the user C and the output position (x3, y3, w3, h3). Because voiceprints of the user A and the user C correspond to a same output position, the user A and the user C may input voice content in (x3, y3, w3, h3) synchronously. In this case, the system may sequentially output the voice content to (x3, y3, w3, h3) based on a sequence of voice collection time of the user A and the user C. In addition, the system may further implement, by establishing the correspondence between the user C and the output position (x3', y3', w3', h3') superimposed on (x3, y3, w3, h3), a scenario in which the user C supplements or modifies content input by the user A. This process is similar to the foregoing implementation description in the first possible scenario, and therefore details are not described again. Therefore, in the second possible scenario, the content of the voiceprint library stored in the system may be shown in Table 4B-1 or Table 4B-2.

TABLE 4B-1

| User | Voiceprint (key) | Output position (value) |
|---|---|---|
| A | Voiceprint feature A | (x3, y3, w3, h3) |
| B | Voiceprint feature B | (x2, y2, w2, h2) |
| C | Voiceprint feature C | (x3, y3, w3, h3) |

TABLE 4B-2

| User | Voiceprint (key) | Output position (value) |
|---|---|---|
| A | Voiceprint feature A | (x3, y3, w3, h3) |
| B | Voiceprint feature B | (x2, y2, w2, h2) |
| C | Voiceprint feature C | (x3', y3', w3', h3') |

Optionally, in the foregoing two possible scenarios, the system may display, in a differentiated manner, the voice content input by the user A and the voice content input by the user C. Specifically, the supplemented content or the superimposed output content of the user C may be displayed on the touchscreen in a format different from that of the voice content of the user A. For example, the voice content of the user C is displayed in a color, a font, or another format different from that used when voice text of the user A is displayed. A manner in which the system displays voice content of different users in different formats is not limited in this application.

It can be learned that, in this embodiment of this application, a plurality of users may further input content on the touchscreen by using voice in a mutual collaboration manner, so that input efficiency and experience are improved.

Various implementation scenarios in the conference site described above do not constitute a limitation on embodiments of this application. It may be understood that, embodiments of this application may be further applied to another scenario in which touchscreen input is implemented by using voice. For example, in an education scenario, a teacher and a student independently or collaboratively input content on an interactive electronic blackboard in a voice manner, or in a home scenario, for example, family members independently or collaboratively input content on a tablet, a computer display with a touch function, or an electronic whiteboard in a voice manner.

In embodiments of this application, the human-computer interaction system may be divided based on the foregoing method example. With reference to FIG. 1, the human-computer interaction system shown in FIG. 1 may be used to perform a human-computer interaction method, for example, used to perform the method shown in FIG. 4A and FIG. 4B. The human-computer interaction system includes a touchscreen 13, a processor 11, and a memory 12.

The touchscreen 13 is configured to: receive a touch operation, and send position information of the touch operation to the processor 11.

The processor 11 is configured to establish a correspondence between a first voiceprint and a first output position on the touchscreen 13.

The processor 11 is further configured to: receive first voice, and when it is determined that a voiceprint of the voice matches the first voiceprint, recognize content of the voice, and output and display the content of the voice to the first output position.

The memory 12 is configured to store data, instructions, or program code. When invoking and executing the instructions or the program code stored in the memory 12, the processor 11 can implement the human-computer interaction method provided in embodiments of this application.

In the foregoing process, when establishing the correspondence between the first voiceprint and the first output position on the touchscreen 13, the processor 11 is specifically configured to: receive position information of a touch operation and receive second voice; and when it is determined that the touch operation matches a predetermined first rule and the second voice matches a predetermined second rule, determine the first output position on the touchscreen 13 based on a position of the touch operation, extract the first voiceprint from the second voice, and establish the correspondence between the first voiceprint and the first output position on the touchscreen 13. For example, with reference to FIG. 4A and FIG. 4B, the touchscreen 13 may be configured to perform S402 and S404, and the processor 11 may be configured to perform S406, S408, S414, S416, S422, S424, and S426. In the foregoing process, when determining the first output position on the touchscreen 13 based on the position of the touch operation, the processor 11 is specifically configured to determine a start position and a range of the first output position on the touchscreen 13 based on a contact position set in the position of the touch operation. Optionally, the processor 11 is further configured to: output and display the first output position on the touchscreen 13.

Optionally, the processor 11 is further configured to remove the correspondence between the first voiceprint and the first output position on the touchscreen 13.

Optionally, the processor 11 is further configured to establish a correspondence between a second voiceprint and the first output position on the touchscreen 13. In this case, when receiving third voice and it is determined that a voiceprint of the third voice matches the second voiceprint, the processor 11 recognizes content of the third voice, and outputs and displays the content to a blank area of the first output position on the touchscreen 13 or overwrites the content of the first voice. Optionally, in this case, the processor 11 is further configured to select, when outputting the content of the third voice, an output format different from an output format of outputting the content of the first voice.

Optionally, when the second voice received by the processor 11 is collected by a microphone array, the processor 11 is further configured to: calculate a position of a sound source of the second voice, and before establishing the correspondence between the first voiceprint and the first output position, the processor 11 is further configured to determine whether the position of the sound source of the second voice and the position of the touch operation meet a preset condition. For example, with reference to FIG. 4A and FIG. 4B, the processor 11 may be configured to perform S415.

Optionally, the processor 11 is further configured to receive an image near the front of the touchscreen 13, and after it is determined that the touch operation matches the predetermined first rule and the first voice matches the predetermined second rule, the processor 11 is further configured to: analyze and track the image in real time, and determine, based on an image analysis and tracking result, whether a user performing the touch operation and a user making the first voice are a same user.

Optionally, the touchscreen 13 is further configured to display text content, an output position, or a scroll bar based on an instruction of the processor 11.

Optionally, a voice collector 14 may be configured to: collect voice, and send the collected voice to the processor 11. For example, with reference to FIG. 4A and FIG. 4B, the voice collector 14 may be configured to perform S410, S412, S418, and S420.

Optionally, an image collector 15 may be configured to: collect an image near the front of the touchscreen 13, and send the image to the processor 11 in real time.

For specific descriptions of the foregoing optional manners, refer to the foregoing method embodiments, and details are not described herein again. In addition, for explanations of any human-computer interaction system provided above and descriptions of beneficial effects, refer to the foregoing corresponding method embodiment. Details are not described again.

In addition, in embodiments of this application, the processor or the computer device including the processor may be divided into functional modules based on the foregoing method example. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, division into the modules is an example and is merely logical function division, and may be other division in actual implementation.

Figure 7:
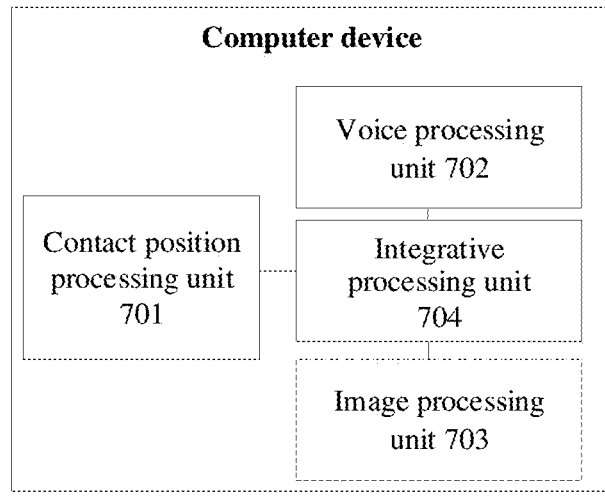
FIG. 7 is a schematic diagram of a structure of a computer device according to an embodiment of this application.

FIG. 7 is a schematic diagram of a structure of a processor or a computer device according to an embodiment of this application. The processor or the computer device is configured to perform the foregoing human-computer interaction method, for example, configured to perform the method shown in FIG. 4A and FIG. 4B. The processor or the computer device may include a voice processing unit 702 and an integrative processing unit 704.

The voice processing unit 702 is configured to: receive first voice, and when it is determined that a voiceprint of the first voice matches a first voiceprint, recognize content of the first voice.

The integrative processing unit 704 is configured to: establish a correspondence between the first voiceprint and a first output position, and output the content of the first voice to the first output position.

The processor or computing device further includes a contact position processing unit 701, configured to receive a contact position, where the contact position is generated by a touch operation. The contact position processing unit 701 is further configured to: when it is determined that the contact position matches a predetermined first rule, determine the first output position based on the contact position.

The voice processing unit 702 is further configured to: receive second voice, and when it is determined that the second voice matches a predetermined second rule, extract the first voiceprint from the second voice.

With reference to FIG. 4A and FIG. 4B, the contact position processing unit 701 may be configured to perform S406 and S408, the voice processing unit 702 may be configured to perform S414, S422, and S424, and the integrative processing unit 704 may be configured to perform S416 and S426.

In the foregoing process, when determining the first output position based on the contact position, the contact position processing unit 701 is specifically configured to determine a start position and a range of the first output position based on a contact position set in the contact position. Optionally, the integrative processing unit 704 is further configured to output the first output position.

Optionally, the integrative processing unit 704 is further configured to remove the correspondence between the first voiceprint and the first output position.

Optionally, the voice processing unit 702 is further configured to: receive third voice, and when it is determined that a voiceprint of the third voice matches a second voiceprint, recognize content of the third voice. The integrative processing unit 704 is further configured to: establish a correspondence between the second voiceprint and the first output position, and output the content of the third voice to the first output position, for example, to a blank area of the first output position, or overwrite the content of the first voice.

Optionally, when the second voice received by the voice processing unit 702 is collected by a microphone array, the voice processing unit 702 is further configured to calculate a position of a sound source of the second voice. In this case, the integrative processing unit 704 is further configured to determine, before establishing the correspondence between an identifier of the first voiceprint and the first output position, whether the position of the sound source of the second voice and the contact position meet a preset condition. For example, with reference to FIG. 4A and FIG. 4B, the integrative processing unit 704 may be configured to perform S415.

Optionally, the processor or the computer device may further include an image processing unit 703, configured to: receive an image, analyze and track the image in real time before the integrative processing unit 704 establishes the correspondence between the identifier of the first voiceprint and the first output position, and determine, based on an analysis and tracking result, whether a user performing the touch operation and a user making the first voice are a same user.

The foregoing mainly describes the solutions provided in embodiments of this application from a method perspective. To implement the foregoing functions, corresponding hardware structures and/or software modules for performing the functions are included. A person skilled in the art should be easily aware that, units, algorithms, and steps in the examples described with reference to embodiments disclosed in this specification can be implemented in a form of hardware or a combination of hardware and computer software in this application. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this application.

In an example, with reference to FIG. 1, the functions implemented by the contact position processing unit 701, the voice processing unit 702, the integrative processing unit 704, and the image processing unit 703 in the computer device are the same as functions of the processor 11 in FIG. 1.

For specific descriptions of the foregoing optional manners, refer to the foregoing method embodiment, and details are not described herein again. In addition, for explanations of any processor or computer device provided above and descriptions of beneficial effects, refer to the foregoing corresponding method embodiment. Details are not described again.

Another embodiment of this application further provides a computer-readable storage medium, and the computer-readable storage medium stores instructions. When the instructions are run on a human-computer interaction system or a computer device, the human-computer interaction system or the computer device performs the steps performed by the human-computer interaction system or the computer device in the method procedure shown in the foregoing method embodiment.

In some embodiments, the disclosed methods may be implemented as computer program instructions encoded in a machine-readable format on a computer-readable storage medium or encoded on another non-transitory medium or product.

Figure 8:
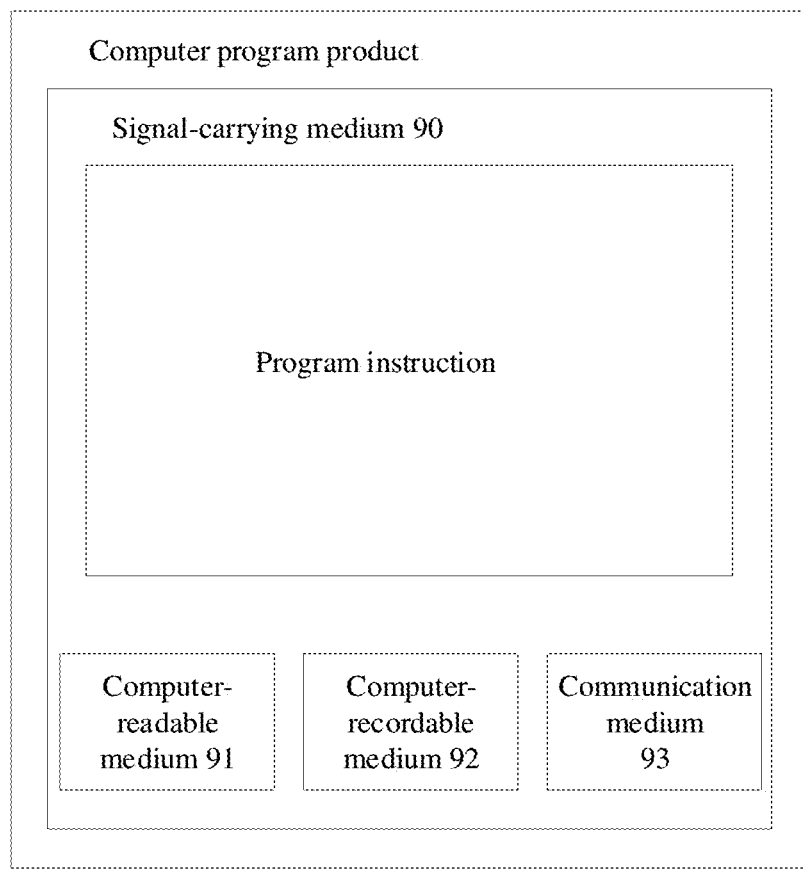
FIG. 8 is a schematic diagram of a structure of a computer program product according to an embodiment of this application.

FIG. 8 schematically shows a conceptual partial view of a computer program product according to an embodiment of this application. The computer program product includes a computer program used to execute a computer process on a computing device.

In an embodiment, the computer program product is provided by using a signal-carrying medium 90. The signal-carrying medium 90 may include one or more program instructions. When the program instructions are run by one or more processors, the functions or some of the functions described for FIG. 4A and FIG. 4B may be provided. Therefore, for example, one or more features with reference to S402 to S426 in FIG. 4A and FIG. 4B may be undertaken by one or more instructions associated with the signal-carrying medium 90. In addition, the program instructions in FIG. 8 also describe example instructions.

In some examples, the signal-carrying medium 90 may include a computer-readable medium 91, for example, but not limited to, a hard disk drive, a compact disc (CD), a digital video disc (DVD), a digital tape, a memory, a read-only memory (ROM), or a random access memory (RAM).

In some implementations, the signal-carrying medium 90 may include a computer-recordable medium 92, for example, but not limited to, a memory, a read/write (R/W) CD, or an R/W DVD.

In some implementations, the signal-carrying medium 90 may include a communication medium 93, for example, but not limited to, a digital and/or analog communication medium (for example, an optical fiber cable, a waveguide, a wired communication link, or a wireless communication link).

The signal-carrying medium 90 may be conveyed by the communication medium 93 in a wireless form (for example, a wireless communication medium that complies with the IEEE 802.11 standard or another transmission protocol). The one or more program instructions may be, for example, computer-executable instructions or logic implementation instructions.

In some examples, for example, the human-computer interaction system or the computer device described for FIG. 4A and FIG. 4B may be configured to provide various operations, functions, or actions in response to one or more program instructions in the computer-readable medium 91, the computer-recordable medium 92, and/or the communication medium 93.

It should be understood that, the arrangement described herein is merely used as an example. Therefore, a person skilled in the art appreciates that, another arrangement and another element (for example, a machine, an interface, a function, a sequence, and a functional group) can be alternatively used, and some elements may be omitted together based on a desired result. In addition, many of the described elements are functional entities that can be implemented as discrete or distributed components, or implemented in any suitable combination at any suitable position in combination with another component.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When computer-executable instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The foregoing descriptions are merely specific implementations of this application. Any variation or replacement readily figured out by a person skilled in the art based on the specific implementations provided in this application shall fall within the protection scope of this application.

What is claimed is:

1. A method comprising:
receiving a touch operation on a touchscreen and a second voice; and
when the touch operation matches a predetermined first rule and the second voice matches a predetermined second rule, determining a first output position on the touchscreen based on a position of the touch operation on the touchscreen, wherein the predetermined first rule is that the touch operation indicates to begin voice input, and the predetermined second rule is that the second voice indicates to begin voice input;
extracting a first voiceprint from the second voice;
establishing a correspondence between the first voiceprint and the first output position on the touchscreen; and
receiving a first voice, and when a voiceprint of the first voice matches the first voiceprint, recognizing content of the first voice, and displaying the content of the first voice at the first output position on the touchscreen based on the correspondence between the first voiceprint and the first output position.

2. The method according to claim 1, wherein determining the first output position on the touchscreen based on the position of the touch operation comprises:
determining a start position and a range of the first output position on the touchscreen based on a contact position set in the position of the touch operation.

3. The method according to claim 1, wherein before establishing the correspondence between the first voiceprint and the first output position on the touchscreen, the method further comprises:
calculating a position of a sound source of the second voice, and determining that the position of the sound source of the second voice and the position of the touch operation meet a preset condition.

4. The method according to claim 1, further comprising: displaying a region on the touchscreen in a manner that distinguishes the region from a current background on the touchscreen, wherein the region is indicated by the first output position.

5. The method according to claim 1, further comprising: removing the correspondence between the first voiceprint and the first output position on the touchscreen.

6. The method according to claim 1, further comprising:
establishing a correspondence between a second voiceprint and the first output position on the touchscreen; and
receiving a third voice, and when a voiceprint of the third voice matches the second voiceprint, recognizing content of the third voice, and displaying the content of the third voice in a blank area of the first output position on the touchscreen.

7. The method according to claim 6, wherein displaying the content of the third voice in the blank area of the first output position comprises:
displaying the content of the third voice in a format different from a format of displaying the content of the first voice.

8. The method according to claim 1, further comprising:
establishing a correspondence between a second voiceprint and the first output position on the touchscreen; and
receiving a third voice, and when a voiceprint of the third voice matches the second voiceprint, recognizing content of the third voice, displaying the content of the third voice at the first output position, and overwriting the content of the first voice.

9. The method according to claim 1, further comprising:
determining a position of a sound source of the first voice using a microphone array.

10. A human-computer interaction system, wherein the human-computer interaction system comprises a touchscreen and at least one processor, wherein
the touchscreen is configured to receive a touch operation; and
the at least one processor is configured to:
receive a first touch operation on the touchscreen and a second voice;
when the first touch operation matches a predetermined first rule and the second voice matches a predetermined second rule, determine a first output position on the touchscreen based on a position of the first touch operation on the touchscreen, and extract a first voiceprint from the second voice, wherein the predetermined first rule is that the touch operation indicates to begin voice input, and the predetermined second rule is that the second voice indicates to begin voice input;
establish a correspondence between the first voiceprint and the first output position on the touchscreen; and
receive a first voice, and when a voiceprint of the first voice matches the first voiceprint, recognize content of the first voice; and
wherein the touchscreen is further configured to display the content of the first voice at the first output position on the touchscreen based on the correspondence between the first voiceprint and the first output position.

11. The system according to claim 10, wherein the at least one processor is further configured to determine a start position and a range of the first output position on the touchscreen based on a contact position set in the position of the touch operation.

12. The system according to claim 10, wherein before establishing the correspondence between the first voiceprint and the first output position on the touchscreen, the at least one processor is further configured to:
calculate a position of a sound source of the second voice, and determine whether the position of the sound source of the second voice and the position of the touch operation meet a preset condition.

13. The system according to claim 10, wherein the touchscreen is further configured to display a region on the touchscreen in a manner that distinguishes the region from a current background on the touchscreen, and the region is indicated by the first output position.

14. The system according to claim 10, wherein the at least one processor is further configured to remove the correspondence between the first voiceprint and the first output position on the touchscreen.

15. The system according to claim 10, wherein the at least one processor is further configured to:
establish a correspondence between a second voiceprint and the first output position on the touchscreen; and
receive a third voice, and when a voiceprint of the third voice matches the second voiceprint, recognize content of the third voice; and
wherein the touchscreen is further configured to: display the content of the third voice in a blank area of the first output position on the touchscreen.

16. The system according to claim 15, wherein the touchscreen is further configured to display the content of the third voice in a format different from a format of displaying the content of the first voice.

17. The system according to claim 10, wherein the at least one processor is further configured to:
establish a correspondence between a second voiceprint and the first output position on the touchscreen; and
receive a third voice, and when a voiceprint of the third voice matches the second voiceprint, recognize content of the third voice; and
wherein the touchscreen is further configured to: display the content of the third voice at the first output position, and overwrite the content of the first voice.

18. The system according to claim 10, wherein the at least one processor is further configured to:
determine a position of a sound source of the first voice using a microphone array.

19. A non-transitory computer-readable storage medium, wherein the computer-readable storage medium stores a computer program, and when the computer program is executed on a computer, the computer is caused to perform:
receiving a touch operation on a touchscreen and a second voice; and
when the touch operation matches a predetermined first rule and the second voice matches a predetermined second rule, determining a first output position on the touchscreen based on a position of the touch operation on the touchscreen, wherein the predetermined first rule is that the touch operation indicates to begin voice input, and the predetermined second rule is that the second voice indicates to begin voice input;
extracting a first voiceprint from the second voice;
establishing a correspondence between the first voiceprint and the first output position on the touchscreen; and
receiving a first voice, and when a voiceprint of the first voice matches the first voiceprint, recognizing content of the first voice, and outputting the content of the first voice to the first output position for display based on the correspondence between the first voiceprint and the first output position.

20. The non-transitory computer-readable storage medium according to claim 19, wherein when the computer program is executed on the computer, the computer is caused to further perform:
determining a position of a sound source of the first voice using a microphone array.

* * * * *